(12) United States Patent
Muthiah

(10) Patent No.: US 11,797,190 B2
(45) Date of Patent: Oct. 24, 2023

(54) DATA STORAGE DEVICE AND METHOD FOR PROVIDING A TEMPERATURE-DRIVEN VARIABLE STORAGE CAPACITY POINT

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 4 days.

(21) Appl. No.: 17/541,969

(22) Filed: Dec. 3, 2021

(65) Prior Publication Data

US 2023/0176742 A1    Jun. 8, 2023

(51) Int. Cl.
*G06F 3/06*     (2006.01)
*G06F 11/30*    (2006.01)

(52) U.S. Cl.
CPC .......... *G06F 3/0614* (2013.01); *G06F 3/0653* (2013.01); *G06F 3/0673* (2013.01); *G06F 11/3034* (2013.01); *G06F 11/3058* (2013.01)

(58) Field of Classification Search
CPC .. G06F 11/30; G06F 11/3034; G06F 11/3037; G06F 11/3058; G06F 3/06
See application file for complete search history.

(56) References Cited

U.S. PATENT DOCUMENTS

| | | | |
|---|---|---|---|
| 9,535,614 B2 | 1/2017 | Reddy et al. | |
| 9,668,337 B2 | 5/2017 | Stoev et al. | |
| 9,767,012 B2 | 9/2017 | Walker et al. | |
| 9,891,859 B1 * | 2/2018 | Vogan | G11C 16/10 |
| 10,908,844 B2 | 2/2021 | Muthiah | |
| 11,449,267 B1 * | 9/2022 | Rehmeyer | G06F 3/0679 |
| 2013/0182507 A1 * | 7/2013 | Marko | G11C 16/20 365/185.21 |
| 2020/0356380 A1 * | 11/2020 | Kelly | G06F 11/3058 |
| 2021/0240381 A1 | 8/2021 | Sato | |
| 2021/0342242 A1 * | 11/2021 | Ohno | G06F 3/0614 |
| 2022/0057952 A1 * | 2/2022 | Bueb | G06F 3/0659 |
| 2022/0187987 A1 * | 6/2022 | Huang | G11C 7/04 |
| 2022/0229580 A1 * | 7/2022 | Palmer | G06F 3/0653 |

OTHER PUBLICATIONS

An IP.com Prior Art Database Technical Disclosure, "Method and Apparatus for Temperature Reduction for NVMe Storage System for Retention of Premium Application Performance", IPCOM000261802D, Apr. 5, 2020 (Year: 2020).*

* cited by examiner

*Primary Examiner* — Khoa D Doan
(74) *Attorney, Agent, or Firm* — Crowell & Moring LLP

(57) ABSTRACT

A data storage device and method for providing a temperature-driven variable storage capacity point are provided. In one embodiment, the data storage device determines that a temperature of the memory exceeds a threshold that triggers a decrease in performance of the data storage device; informs a host in communication with the data storage device that the temperature of the memory exceeds the threshold; receives an instruction from the host to avoid the decrease in the performance of the data storage device by reducing an effective capacity of the memory for an amount of time; and reduces the effective capacity of the memory for at least part of the amount of time by foregoing a background operation that maintains or increases the effective capacity of the memory. Other embodiments are possible, and each of the embodiments can be used alone or together in combination.

19 Claims, 8 Drawing Sheets

ABSTRACT
DATA STORAGE DEVICE AND METHOD FOR PROVIDING A TEMPERATURE-DRIVEN VARIABLE STORAGE CAPACITY POINT

BACKGROUND

Data storage devices are used to store data from a host. The environment conditions and the state of the memory in the data storage device often affect memory performance. For example, if the memory is new, it may provide better performance compared to after the memory has gone through multiple program-erase cycles. Also, two data storage devices operating in different temperature and/or power conditions may provide different performance levels to the host. This is because flash memories are temperature and power-state sensitive, and different state machines may be used according to the operating temperatures and power. Further, some data storage devices may throttle host data when the temperature of the memory exceeds a temperature threshold to allow the memory to cool down.

DETAILED DESCRIPTION

Overview

Figure 1A:
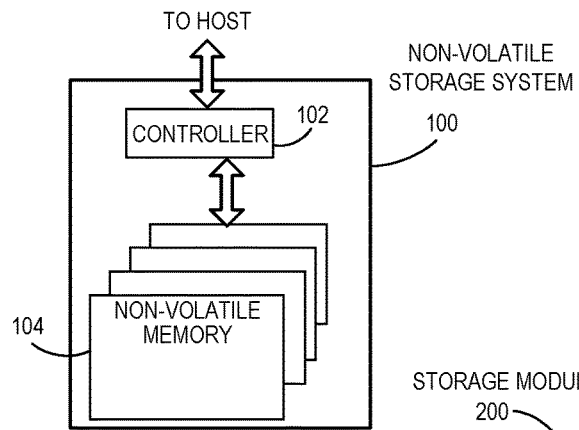
FIG. 1A is a block diagram of a data storage device of an embodiment.

By way of introduction, the below embodiments relate to a data storage device and method for providing a temperature-driven variable storage capacity point. In one embodiment, a data storage device is provided comprising a memory and a controller. The controller is configured to determine that a temperature of the memory exceeds a threshold that triggers a decrease in performance of the data storage device; inform a host in communication with the data storage device that the temperature of the memory exceeds the threshold; receive an instruction from the host to avoid the decrease in the performance of the data storage device by reducing an effective capacity of the memory for an amount of time; and reduce the effective capacity of the memory for at least part of the amount of time by foregoing a background operation that maintains or increases the effective capacity of the memory.

In some embodiments, the controller is further configured to: determine a need to perform the background operation prior to an expiration of the amount of time; and perform the background operation irrespective of whether performing the background operation decreases performance of the data storage device.

In some embodiments, the controller is further configured to: prior to an expiration of the amount of time, determine that the temperature of the memory no longer exceeds the threshold; and inform the host that the temperature of the memory no longer exceeds the threshold.

In some embodiments, the controller is further configured to: receive an instruction from the host to cease reducing the effective capacity of the memory; and perform the background operation.

In some embodiments, the controller is further configured to inform the host of a power state of the data storage device.

In some embodiments, the background operation comprises a garbage collection operation.

In some embodiments, the background operation comprises a folding operation that moves data from single-level cell (SLC) blocks in the memory to multi-level cell (MLC) blocks in the memory.

In some embodiments, the data storage device further comprises a cache configured for use during performance of the background operation and the controller is further configured to use the cache to perform a host operation during the amount of time.

In some embodiments, the memory comprises a three-dimensional memory.

In another embodiment, a method is provided that is performed in a host in communication with a data storage device comprising a memory. The method comprises receiving, from the data storage device, information about at least one of a thermal state and a power state of the data storage device that reduces a quality of service provided to the host; determining that the reduced quality of service is below a quality-of-service level that is acceptable to the host; and instructing the data storage device to operate in a lower-memory-capacity-point mode to provide the quality-of-service level that is acceptable to the host.

In some embodiments, the method further comprises determining the quality-of-service level that is acceptable to the host.

In some embodiments, the method further comprises receiving, from the data storage device, a notification that the at least one of the thermal state and the power state of the data storage device improved such that the lower-memory-capacity-point mode is no longer needed to provide the quality-of-service level that is acceptable to the host.

In some embodiments, the method further comprises instructing the data storage device to exit the lower-memory-capacity-point mode.

In some embodiments, the method further comprises instructing the data storage device to operate in the lower-memory-capacity-point mode for a duration of time.

In some embodiments, the method further comprises receiving a notification from the data storage device prior to an expiration of duration of time that the data storage device needed to exit the lower-memory-capacity-point mode.

In some embodiments, the data storage device exited the lower-memory-capacity-point mode to perform a background operation.

In some embodiments, the background operation comprises a garbage collection operation.

In some embodiments, the background operation comprises a folding operation that moves data from single-level cell (SLC) blocks in the memory to multi-level cell (MLC) blocks in the memory.

In some embodiments, the at least one of the thermal state and the power state only comprises the thermal state.

In another embodiment, a data storage device is provided comprising: a memory; means for informing a host in communication with the data storage device that a temperature of the memory exceeds a threshold; means for receiving an instruction from the host to reduce an effective capacity of the memory; and means for reducing the effective capacity of the memory.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
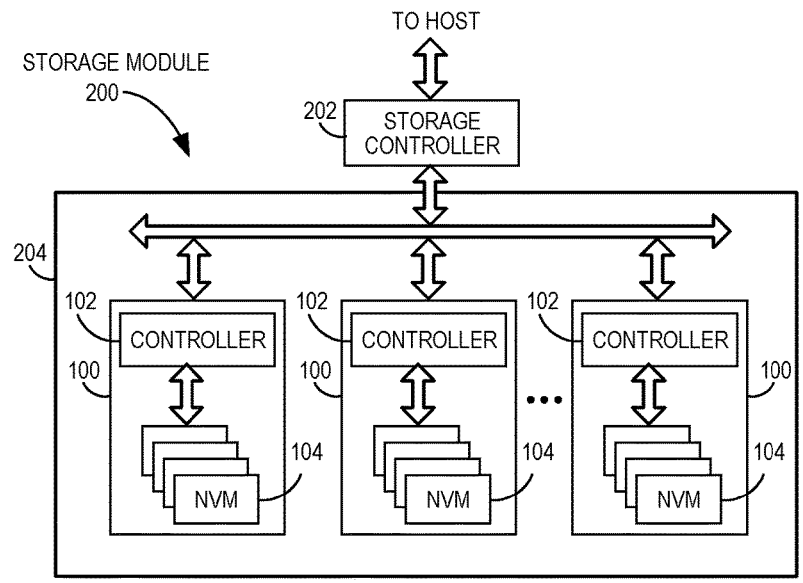
FIG. 1B is a block diagram illustrating a storage module of an embodiment.
Figure 1C:
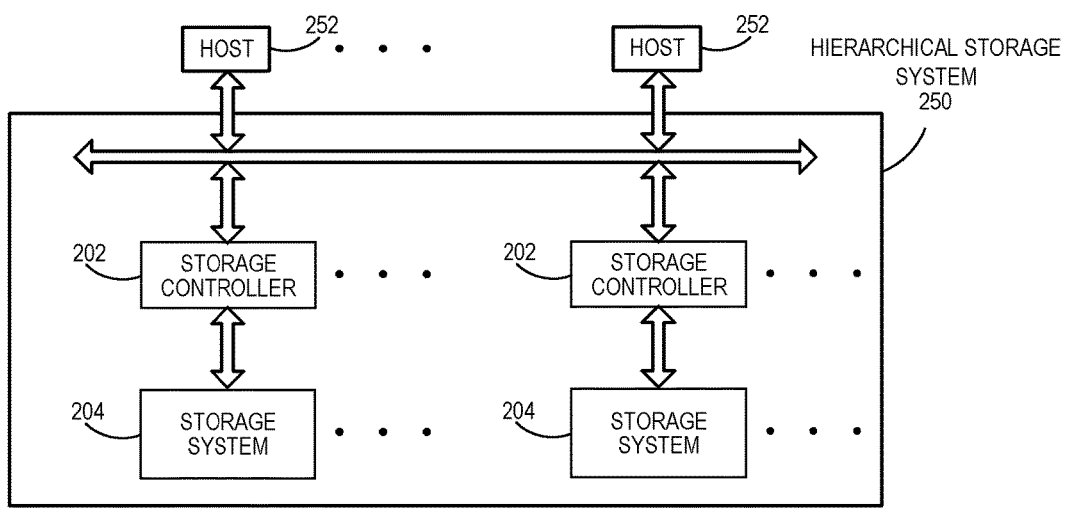
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
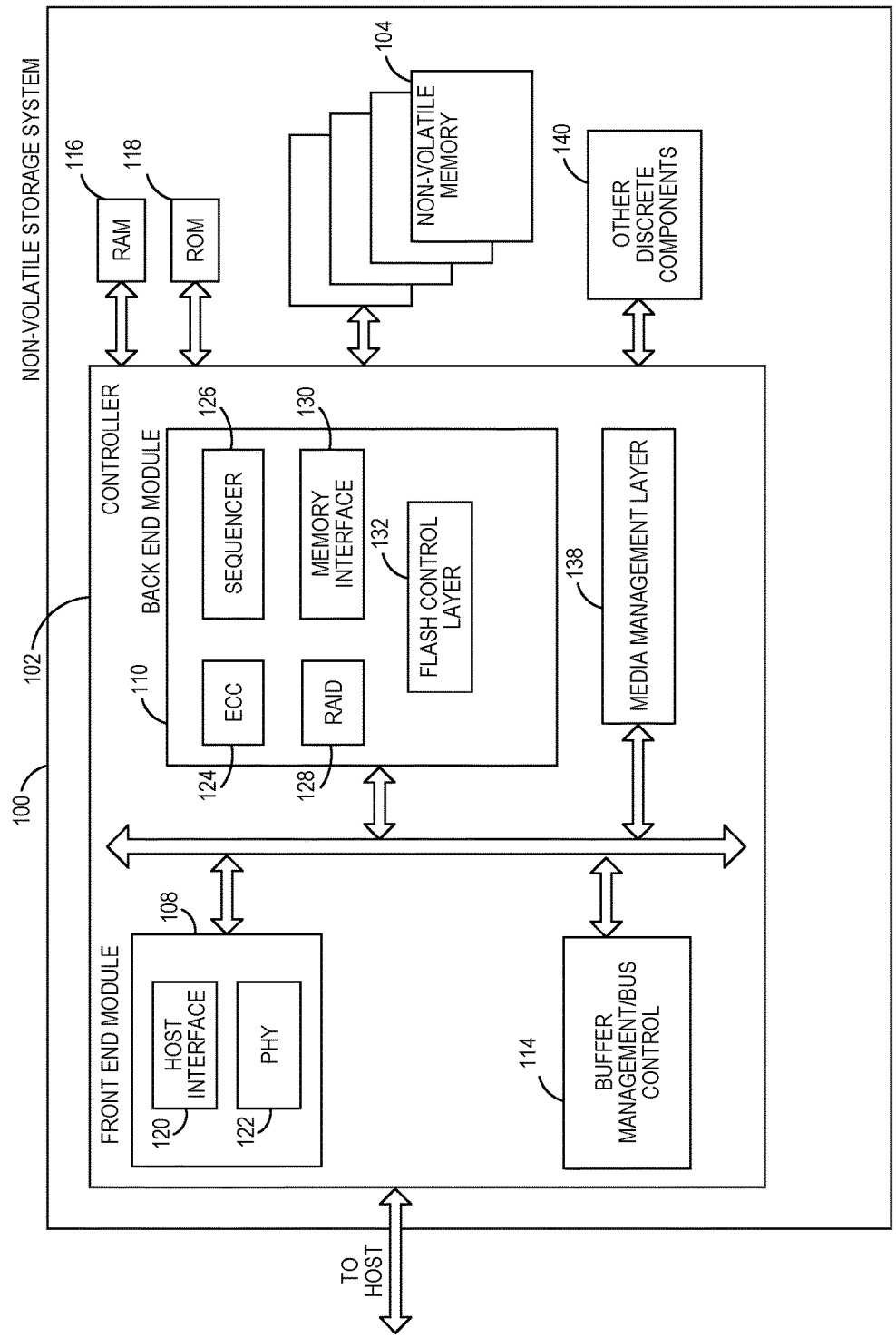
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
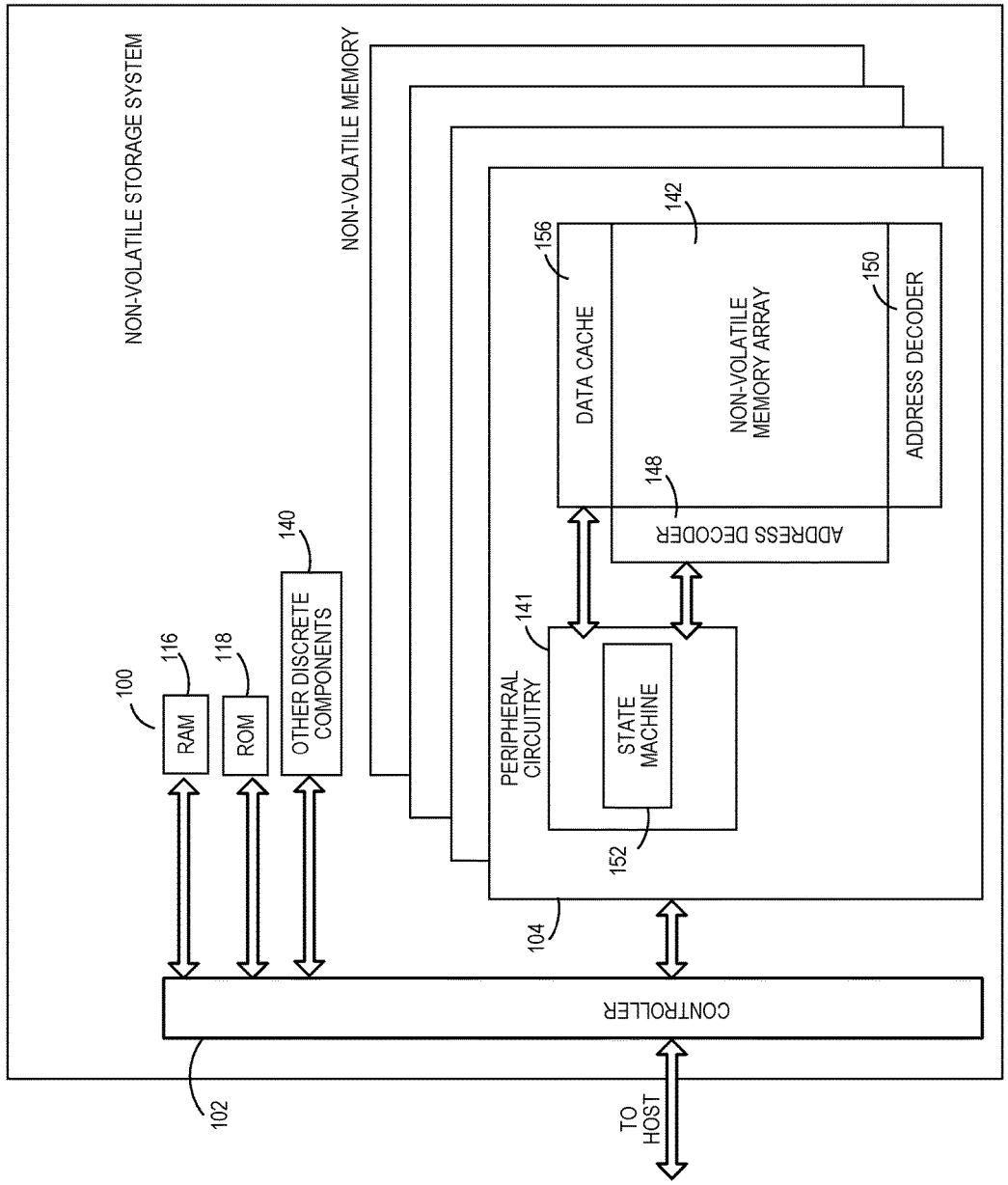
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
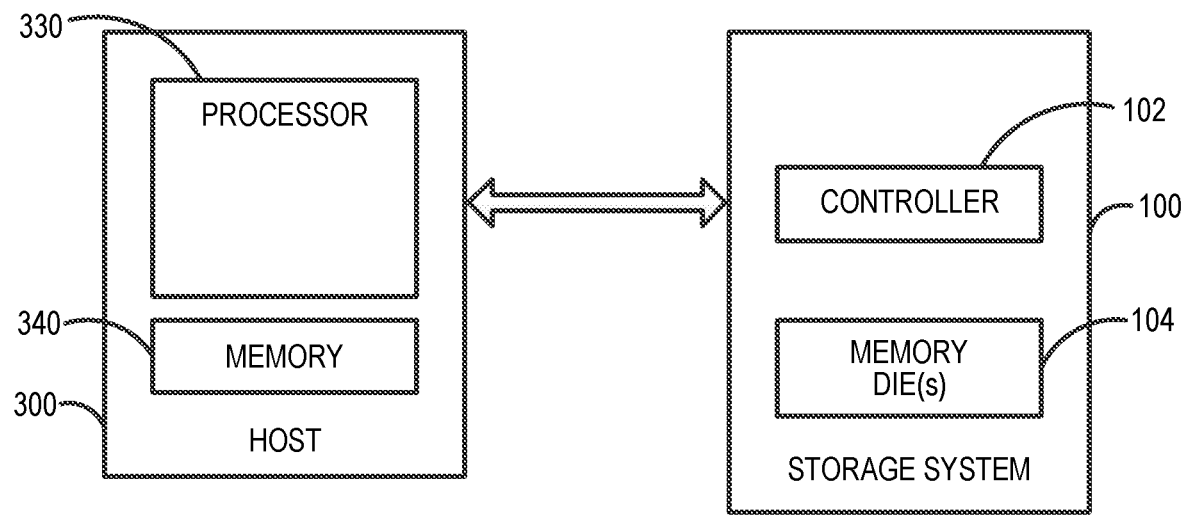
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, storage devices are used to store data from a host. The environment conditions and the state of the memory in the data storage device often affect memory performance. For example, if the memory is new, it may provide better performance compared to after the memory has gone through multiple program-erase cycles. Also, two data storage devices operating in different temperature and/or power conditions may provide different performance levels to the host. This is because flash memories are temperature and power-state sensitive, and different state machines may be used according to the operating temperatures.

Also, during high temperatures, some data storage systems will suspend folding data from SLC blocks to MLC blocks, as moving data across multiple regions can add to the thermal effect and require more consumption, which can degrade overall system performance. Without being able to fold data, which frees SLC blocks, there is virtually a status quo in the storage capacity of the data storage device. There is a limited default SLC cache pool, beyond which the data storage system takes a performance hit. Further, some data storage devices may throttle host data to allow the memory to cool down when the temperature of the memory exceeds a temperature threshold. Some data storage devices slow down in these circumstances irrespective of a host-defined burst performance if the data storage device's background work has hit a critical condition. Because the host is typically ignorant of whether the memory is encountering any of these various conditions that affect performance, the host may not be able to rely upon a critically-desired performance of the data storage device for a given amount of time. This is in spite of the fact that the memory of the data storage device theoretically has enough host data caching due to its available capacity.

Figure 4:
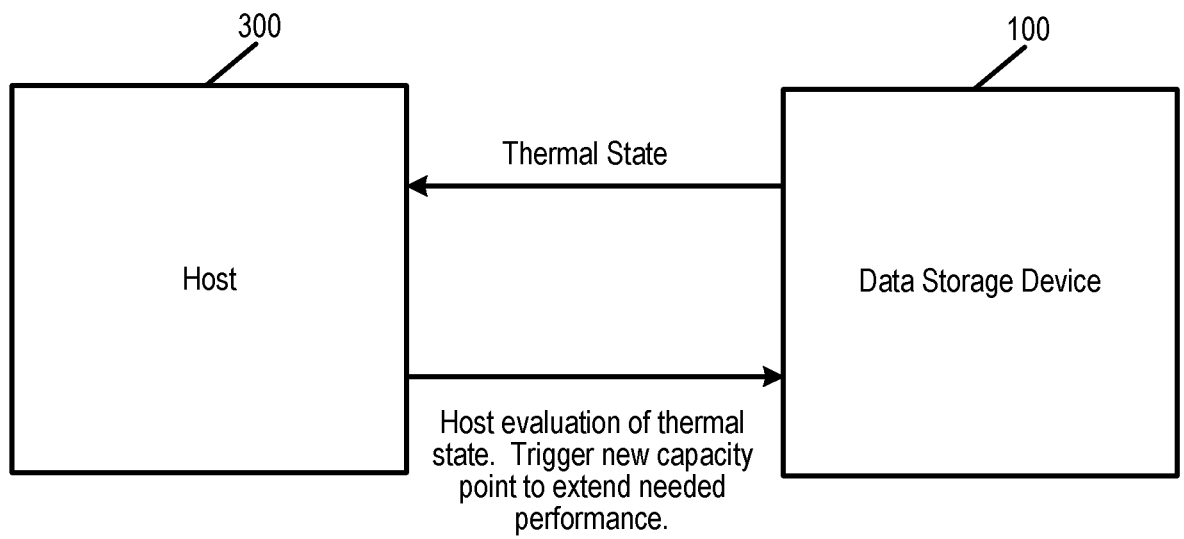
FIG. 4 is a block diagram of a host and a data storage device of an embodiment.

The following embodiments can be used to address this situation by providing an extended, better performance state to the host irrespective of the thermal state (and/or potentially the power state) of the data storage device. As shown in FIG. 4, in one example, the data storage device 100 informs the host 300 of the thermal state (and, in some implementations, and/or the power state) of the data storage device 100 and allows the host 300 to decide whether to trade off capacity for performance. More specifically, the host 300 can evaluate the thermal (and/or power) state and inform the data storage device 100 of a new capacity point to extend a desired/needed quality-of-service performance level.

More specifically, these embodiments can be used for the host 300 to trade-off available memory capacity to handle temperature and power variations in the data storage device 100. With these embodiments, the necessity to move data from one region to another region is avoided to enable the data storage device 100 to recover quickly from thermal effects. In the reduced-capacity mode of operation, the data storage device 100 can perform only host-related operations and can open up its capacity blocks for caching, while abstaining from some or all background (rework) operations that may contribute to further thermal deterioration. One example of a background operation is garbage collection, which can further deteriorate the data storage device's thermal conditions, as well as throttle host performance. However, avoiding garbage collection could mean the loss of capacity blocks. Still trading off capacity for performance may be desired by the host 300. The data storage device 100 can be configured to periodically retrieve back the lost capacity during device recovery.

In general, these embodiments can be used to provide the following functions, which are described in more detail below. First, the data storage device 100 determines that its temperature is more than a threshold, which triggers a reduction in performance below the current host rate, and provides feedback on its thermal state to the host 300. The host 300 can uses this thermal feedback (optionally, alongside the data storage device's power mode) to choose a variable capacity point (lower capacity) to shortly handle its storage requirement. In this embodiment, the mode of operation is host decided and is backward compatible with typical operations of the data storage device 100.

The data storage device 100 can use the capacity margin to delay one or more background operations and concentrate on host-only writes into its cache and capacity blocks (irrespective of block type) with a predetermined quality of service until the thermal condition subsidizes. Writing only host data and avoiding some or all background data writes minimizes further thermal effects and also consumes less power, all at the temporarily cost of a lower capacity point. The data storage device 100 can provide feedback again on its temperature after attaining normal working conditions to enable the host 300 to decide on further actions, including periodically retrieving lost capacity.

The following paragraphs provide an example of one implementation of an embodiment. It should be understood that this is merely an example and other implementations can be used. For instance, while this example is discussed in terms of a thermal state of the data storage device 100, it should be noted that the power state of the data storage device 100 can be used instead of or in addition to the thermal state.

Figure 5:
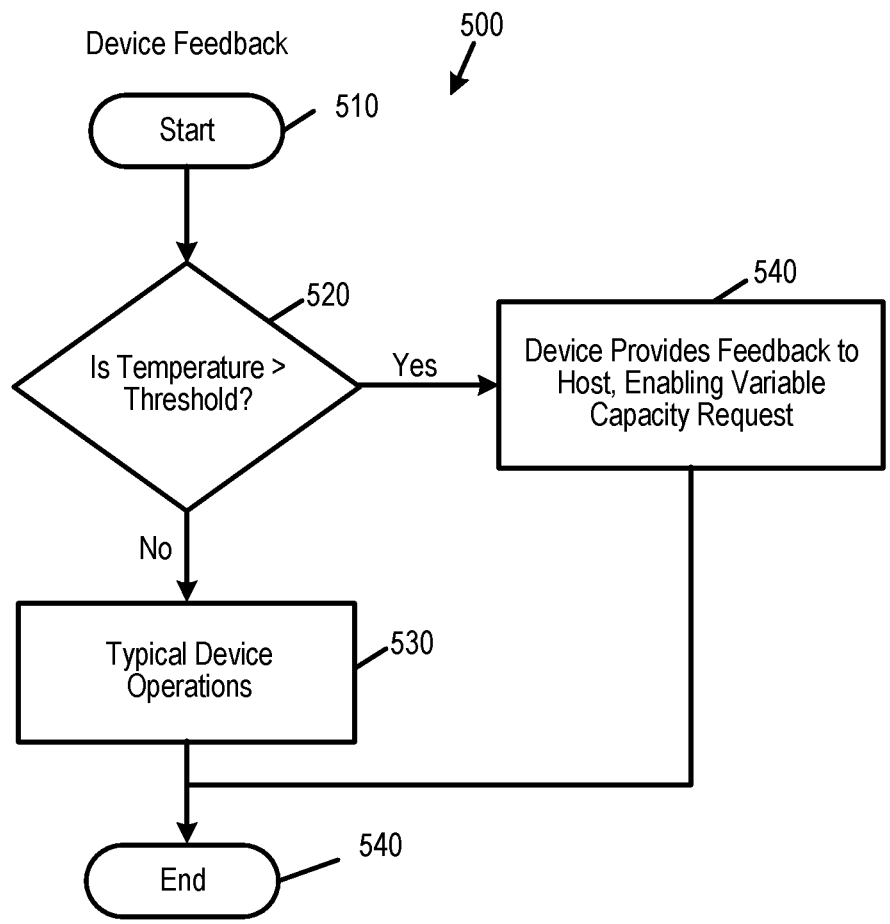
FIG. 5 is a flow chart of a method of an embodiment for providing feedback to a host.

Turning again to the drawings, FIG. 5 is a flow chart 500 of actions taken by the data storage device 100 to provide feedback to the host 300. As shown in FIG. 5, after the method starts (act 510), the controller 102 of the data storage device 100 determines of the temperature of the memory 104 exceeds a threshold (act 520). The controller 102 can make this determination in any suitable way. For example, the temperature can be read from a temperature sensor in the memory 104 or in another location in the data storage device 100. So, it should be understood that "the temperature (thermal state) of the memory 104" is meant to refer to the actual temperature (thermal state) of the memory 104 or a temperature of something else (e.g., the temperature (thermal) of the interior of the data storage device 100) that can be used as a proxy for the temperature (thermal state) of the memory 104. Further, it should also be understood that the threshold can be set to any suitable level. In one embodiment, the level is set to the temperature that would trigger some action (e.g., throttling host commands) that would adversely affect the performance/quality of service/host data throughput rate provided to the host 300.

If the temperature does not exceed the threshold, the data storage device 100 performs its typical operations (act 530), and the method ends (act 540). However, if the temperature does exceed the threshold, the data storage device 100 provides feedback to the host 300, which, as will be described below, can enable the host 300 to make a request to the data storage device 100 to enter a variably-capacity mode (act 540). It should be noted that the feedback can take any suitable form. For example, the data storage device 100 can provide the host 300 with a simple warning, or the data storage device 100 can provide detailed information about the temperature of the memory 104 and/or details on how much performance degradation will be experienced (or not) at various temperatures and/or memory capacity levels.

As mentioned above, the host 300 can use the thermal feedback provided by the data storage device 100 to instruct the data storage device 100 to enter a mode (e.g., for a certain amount of time) in which better performance will be provided at the cost of reduced storage capacity. The host 300 can have this requirement for certain applications, such as for processing edge decisions in artificial intelligence/machine learning environments and for certain high-end gaming applications. The host 300 may determine it has this need based on learning from those applications needing it. Also, the host 300 does not necessarily need to take any action in response to the feedback, as the host 300 may be willing to just accept a hit to performance. This process is illustrated in the flow chart 600 in FIG. 6.

Figure 6:
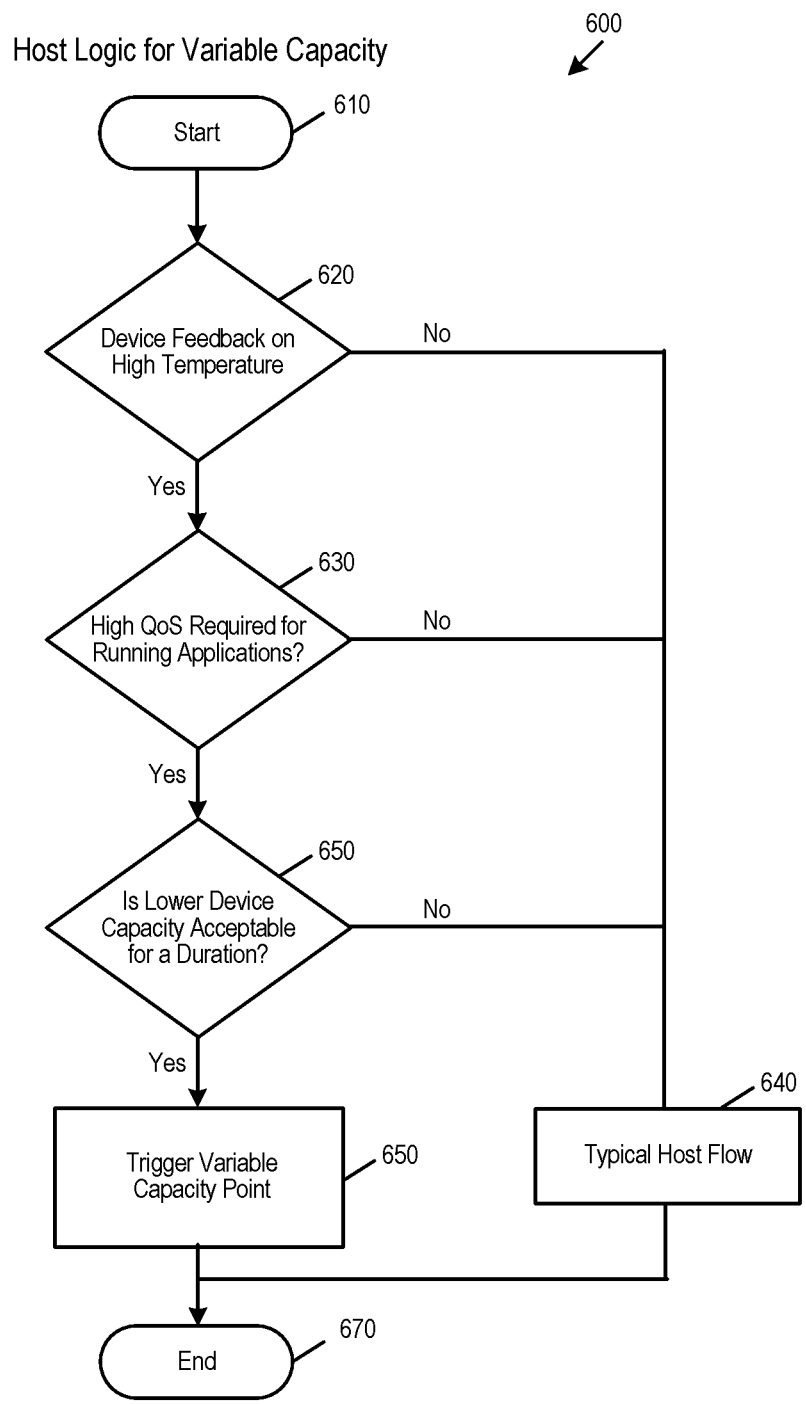
FIG. 6 is a flow chart of a method of an embodiment for providing a variable storage capacity point.

As shown in FIG. 6, after this method starts (act 610), the host 300 receives the feedback noted above from the data storage device 100 (act 620). In some embodiments, the feedback provides the host 300 with a temperature, temperature range, or simply a warning, and the host 300 is configured to understand what that feedback means in terms of a reduction in performance or quality of service. In other embodiments, the feedback expressly indicates what that reduction will be.

The host 300 then determines whether or not to take act (e.g., requesting the performance benefit at the cost of decreased effective storage capacity). In this example, the processor 330 in the host 300 determines if the host 300 (e.g., an application running on the host 300) requires a certain quality-of-service level and whether the reduced quality-of-service level is acceptable (act 630). If the host 300 does not requires a certain quality-of-service level or if the reduced quality-of-service level is acceptable, the host 300 continues with its normal processing flow (act 640). Otherwise, the processor 300 determines whether the host 300 is willing to accept the tradeoff of lower memory capacity to achieve the desired quality-of-service level of a period of time (act 650). If the host 300 is not willing to accept that tradeoff (e.g., if the host 300 has a large amount of data that needs to be stored), the host 300 continues with its normal process flow without requesting the data storage device enter a special mode (act 640). However, if the host 300 is willing to accept that tradeoff, the processor 300 instructs the data storage device 100 to operate under a variable (lower) capacity point (act 660), and the method ends (act 670).

It should be noted that instructing the data storage device 100 to operate under a variable (lower) capacity point can take any suitable form. In some embodiments, the host 300 can be given a binary choice—accept the status quo or request a lower-memory-capacity point mode. In other embodiments, the host 300 is provided with a plurality of choices/performance levels/capacity points to choose from. Further, in some embodiments, the host 300 provides a specific time duration for the data storage device 100 to provide the increased performance level. The host 300 can provide other conditions on the use of the increased performance level as well (e.g., provide increased performance unless the capacity of the memory 104 falls below a certain level or unless some other condition is true or false).

The data storage device 100 takes action after it receives instructions from the host 300. In one embodiment, the capacity of the memory 104 can vary at various points as and when the host 300 requests a new mode based on the data storage device's thermal feedback. That is, if the capacity of the memory 104 can be dynamically defined and varied by the host 300, the variable capacity can be used to provide better performance even toward the end of memory's life. In some implementations, the host 300 can select the performance and the capacity point to be any desirable level at any given point of time. In other implementations, this variable capacity can binary (e.g., regular or high) or be selectable among a limited number of pre-defined levels.

Figure 7:
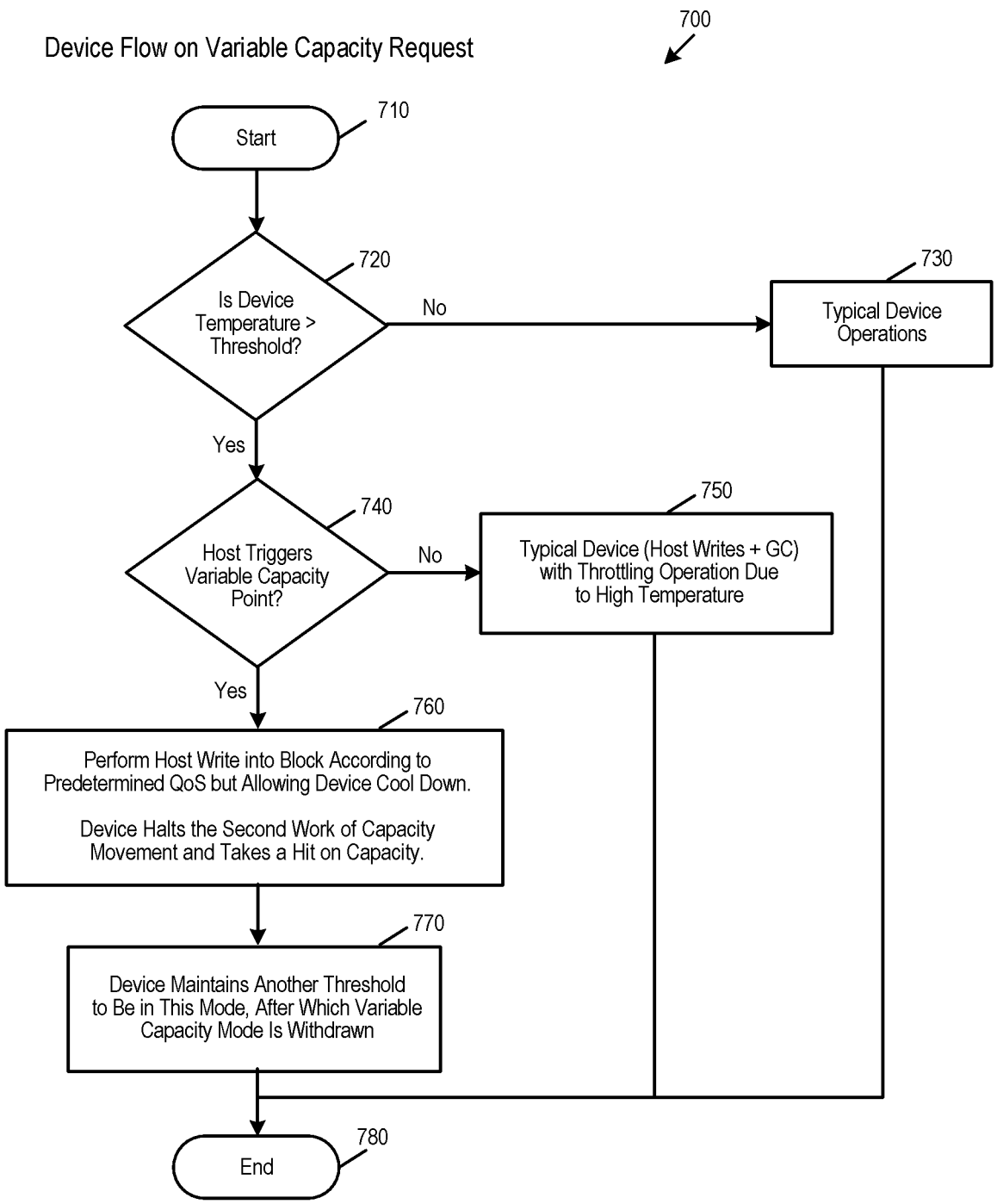
FIG. 7 is a flow chart of a method of an embodiment for providing a variable storage capacity point.

FIG. 7 is a flow chart 700 of a method performed by the data storage device 100 after it provides feedback to the host 300. As shown in FIG. 7, after the method starts (act 710), the controller 102 determines if the temperature of the memory 104 exceeds a threshold (act 720). If the temperature of the memory 104 does not exceed the threshold, there is no performance degradation, so the controller 102 can perform its typical operations (act 730). However, if the temperature of the memory 104 does exceed the threshold, the controller 102 determines if the host 300 triggered a variable capacity point mode, in whatever form that takes (e.g., requesting a certain performance level, requesting the selection of a single higher performance mode, etc.) (act 740). If the host 300 did not trigger a variable capacity point mode, the controller 102 performs typical operations, such as host writes and garbage collection operations, potentially with throttling operations to try to cool-down the memory 104 (act 750).

However, if the host 300 did request a variable capacity point mode, the controller 102 takes action to avoid the decrease in the performance by reducing an effective capacity of the memory 104 (e.g., for an amount of time requested by the host 300). For example, the controller 102 of the data storage device 100 can forego performing a background operation that maintains or increases the effective capacity of the memory 104 beyond the level that it is currently at (act 760). For example, a garbage collection operation can increase the effective capacity of the memory 104 by compacting valid data into fewer blocks. As another example, a folding operation that moves data from SLC blocks to MLC blocks increases the effective storage capacity of the SLC blocks. However, performing these background operations comes at the cost of increased temperature and power consumption and decreased availability of a cache that can otherwise be used to store host data (in the high performance/low capacity mode, the controller 102 can use this cache to perform a host operation since it will not be used for the background operation).

The controller 102 can maintain another threshold that will allow it to exit the variable capacity mode prior to the time requested by the host 300, if such time is requested (act 770). For example, if the free space in the memory 104 is getting critically low (e.g., to the point where it can no longer accept host data), the controller 102 can preempt the host's instructions and perform the background operation to create available memory space, irrespective of whether performing the background operation decreases performance of the data storage device. As another example, the data storage device 100 can provide the feedback when it determines that it is practically not possible for the host 300 to make the memory 104 work on a performance mode for a stipulated time without compromising the capacity point. The thermal feedback can include free block status of the cache and capacity region to enable the host 300 to choose a capacity point. Further, if the controller 102 in the data storage device 100 determines that the temperature of the memory 104 no longer exceeds the threshold that triggered the start of this method, the controller 102 can exit the high performance/low capacity mode automatically or can first inform the host 300 and let the host 300 decide whether it wants to exit the mode.

There are several advantages associated with these embodiments. For example, these embodiments provide a mechanism for the host 300 to decide to trade-off capacity for increased performance. Also, with the reduced capacity mode, the necessity to move data from one region to another region is avoided to enable the data storage device 100 to recover quickly.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
a controller configured to:
  determine that a temperature of the memory exceeds a threshold that triggers a decrease in performance of the data storage device;
  inform a host in communication with the data storage device that the temperature of the memory exceeds the threshold;
  receive an instruction from the host to avoid the decrease in the performance of the data storage device by reducing an effective capacity of the memory for an amount of time;
  reduce the effective capacity of the memory for at least part of the amount of time by forgoing a background operation that maintains or increases the effective capacity of the memory;
  prior to an expiration of the amount of time, determine that the temperature of the memory no longer exceeds the threshold; and
  inform the host that the temperature of the memory no longer exceeds the threshold.

2. The data storage device of claim 1, wherein the controller is further configured to:
  determine a need to perform the background operation prior to the expiration of the amount of time; and
  perform the background operation irrespective of whether performing the background operation decreases performance of the data storage device.

3. The data storage device of claim 1, wherein the controller is further configured to:
  receive an instruction from the host to cease reducing the effective capacity of the memory; and
  perform the background operation.

4. The data storage device of claim 1, wherein the controller is further configured to inform the host of a power state of the data storage device.

5. The data storage device of claim 1, wherein the background operation comprises a garbage collection operation.

6. The data storage device of claim 1, wherein the background operation comprises a folding operation that moves data from single-level cell (SLC) blocks in the memory to multi-level cell (MLC) blocks in the memory.

7. The data storage device of claim 1, further comprising a cache configured for use during performance of the background operation, wherein the controller is further configured to use the cache to perform a host operation during the amount of time.

8. The data storage device of claim 1, wherein the memory comprises a three-dimensional memory.

9. A method comprising:
performing the following in a host in communication with a data storage device comprising a memory:
  receiving, from the data storage device, information about at least one of a thermal state and a power state of the data storage device that reduces a quality of service provided to the host;
  determining that the reduced quality of service is below a quality-of-service level that is acceptable to the host; and
  instructing the data storage device to operate in a lower-memory-capacity-point mode to provide the quality-of-service level that is acceptable to the host.

10. The method of claim 9, further comprising determining the quality-of-service level that is acceptable to the host.

11. The method of claim 9, further comprising:
receiving, from the data storage device, a notification that the at least one of the thermal state and the power state of the data storage device improved such that the lower-memory-capacity-point mode is no longer needed to provide the quality-of-service level that is acceptable to the host.

12. The method of claim 11, further comprising instructing the data storage device to exit the lower-memory-capacity-point mode.

13. The method of claim 9, further comprising instructing the data storage device to operate in the lower-memory-capacity-point mode for a duration of time.

14. The method of claim 13, further comprising receiving a notification from the data storage device prior to an expiration of the duration of time that the data storage device needed to exit the lower-memory-capacity-point mode.

15. The method of claim 14, wherein the data storage device needed to exit the lower-memory-capacity-point mode to perform a background operation.

16. The method of claim 15, wherein the background operation comprises a garbage collection operation.

17. The method of claim 15, wherein the background operation comprises a folding operation that moves data from single-level cell (SLC) blocks in the memory to multi-level cell (MLC) blocks in the memory.

18. The method of claim 9, wherein the at least one of the thermal state and the power state comprises only the thermal state.

19. A data storage device comprising:
a memory; and
controller means for:
  determining that a temperature of the memory exceeds a threshold that triggers a decrease in performance of the data storage device;
  informing a host in communication with the data storage device that the temperature of the memory exceeds the threshold;
  receiving an instruction from the host to avoid the decrease in the performance of the data storage device by reducing an effective capacity of the memory for an amount of time;
  reducing the effective capacity of the memory for at least part of the amount of time by forgoing a background operation that maintains or increases the effective capacity of the memory;
  determining a need to perform the background operation prior to an expiration of the amount of time; and
  performing the background operation irrespective of whether performing the background operation decreases performance of the data storage device.

* * * * *